United States Patent [19]

Buchholz

[11] Patent Number: 5,302,694

[45] Date of Patent: Apr. 12, 1994

[54] PROCESS FOR PREPARING POLYESTERS BASED ON HYDROXYCARBOXYLIC ACIDS

[75] Inventor: Berthold Buchholz, Ingelheim am Rhein, Fed. Rep. of Germany

[73] Assignee: Boehringer Ingelheim GmbH, Ingelheim am Rhein, Fed. Rep. of Germany

[21] Appl. No.: 111,029

[22] Filed: Aug. 24, 1993

Related U.S. Application Data

[63] Continuation of Ser. No. 6,588, Jan. 21, 1993, abandoned, which is a continuation of Ser. No. 837,716, Feb. 19, 1992, abandoned, which is a continuation of Ser. No. 654,859, Feb. 13, 1991, abandoned.

[30] Foreign Application Priority Data

Feb. 21, 1990 [DE] Fed. Rep. of Germany ....... 4005415

[51] Int. Cl.$^5$ .............................................. C08G 63/06
[52] U.S. Cl. .................................... 528/354; 525/439; 528/76; 528/170; 528/171
[58] Field of Search ................... 525/439; 528/76, 170, 528/171, 354

[56] References Cited

U.S. PATENT DOCUMENTS

| | | | |
|---|---|---|---|
| 3,929,728 | 12/1975 | Chimura et al. | 528/285 |
| 4,216,298 | 8/1980 | Schreckenberg et al. | 525/439 |
| 4,297,455 | 10/1981 | Lindner et al. | 525/439 |
| 4,826,945 | 5/1989 | Cohn et al. | 528/76 |
| 4,877,871 | 10/1989 | Klemann et al. | 536/124 |

FOREIGN PATENT DOCUMENTS 0026599 4/1981 European Pat. Off.
55-065223 5/1980 Japan.
60-229919 11/1985 Japan.
1-167329 7/1989 Japan.
958798 5/1964 United Kingdom.

OTHER PUBLICATIONS

J. March, Advanced Organic Chemistry, 3rd Edition, John Wiley and Sons, New York (1985), pp. 348-351.
B. C. Larock, Comprehensive Organic Transformation, VCH-Verlagsgesellschaft, Weinheim (1989), p. 941 ff and p. 966 ff.
I. M. Panayotov et al., Makromol. Chem. 88, (1987), 2821-2830.
D. A. Jaeger et al., J. Org. Chem, 46, No. 24, (1981), 4964-4967.
M. Fieser et al., "Reagents for Organic Synthesis", vol. 9, John Wiley & Sons, New York (1981), pp. 156-157.
F. Pilati, in "Comprehensive Polymer Science: The Synthesis, Characterization, Reactions & Applications of Polymers", Pergamon Press, Oxford (1989), vol. 5, pp. 285-289.
D. Geffken et al., Chem. Ber. 108, (1975), 3730-3735.
N. Belcheva et al., Makromol. Chem., 191, (1990), 213-224.

*Primary Examiner*—Maurice J. Welsh
*Assistant Examiner*—Shelley A. Dodson
*Attorney, Agent, or Firm*—David E. Frankhouser; Alan R. Stempel; Mary-Ellen M. Timbers

[57] ABSTRACT

The present invention relates to a method of producing polyesters based on hydroxycarboxylic acids, more particularly based on α-hydroxycarboxylic acids.

20 Claims, No Drawings

PROCESS FOR PREPARING POLYESTERS BASED ON HYDROXYCARBOXYLIC ACIDS

This is a continuation of application Ser. No. 006,588, filed Jan. 21, 1993, now abandoned which is a continuation of application Ser. No. 837,716, filed Feb. 19, 1992, now abandoned, which is a continuation of application Ser. No. 654,859, filed Feb. 13, 1991, now abandoned.

The present invention relates to a process for preparing polyesters based on hydroxycarboxylic acids, particularly α- or β-hydroxycarboxylic acids or the oligomers thereof according to the following reaction plan.

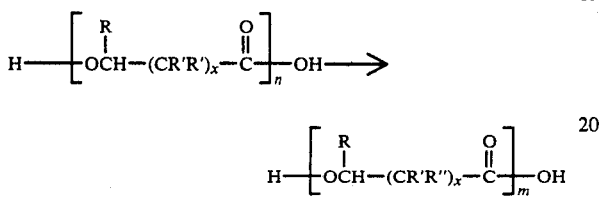

wherein R, R' and R" independently of each other may represent an alkyl and/or hydrogen, preferably a lower alkyl group with 1 to 6 carbon atoms and/or hydrogen and, particularly preferably, a methyl group and/or hydrogen and x and m and n may represent integers wherein m is > than n and x may also be zero.

Alkyl generally represents a branched or unbranched $C_{1-12}$ hydrocarbon group which may optionally be substituted by one or more halogen atom, preferably fluorine, which may differ from one another, lower alkyl groups being preferred.

Lower alkyl generally indicates a branched or unbranched $C_{1-4}$ hydrocarbon group. Examples include methyl, ethyl, propyl, isopropyl, butyl, isobutyl, pentyl, isopentyl, neopentyl, hexyl, isohexyl, heptyl, isoheptyl, octyl and isooctyl.

The reaction is carried out in the presence of reaction-promoting adjuvants (linking reagents) of general formula I

wherein $R^1$ and $R^2$ may be identical or different and may represent an alkyl group, a cycloalkyl group or an aryl group which may optionally be substituted;

or in the presence of reaction-promoting adjuvants of general formula II

wherein $R^3$ and $R^4$ may be identical or different and may represent an alkoxy group, which may optionally be substituted by one or more halogen atoms, a 5-, 6- or 7-membered ring, wherein one or more carbon atoms may be replaced by one or more heteroatoms, whilst said ring may optionally be unsaturated and/or substituted, or a halogen atom, preferably chlorine.

Other suitable linking reagents are sulphonic acid halides of the type of general formula III

wherein $R^5$ represents an optionally substituted alkyl or aryl group and X may represent a halogen atom, preferably chlorine. Examples include methanesulphonic acid chloride, benzenesulphonic acid chloride and toluenesulphonic acid chloride.

Other suitable linking reagents are carbonates of general formula IV

wherein $R^6$ and $R^7$ independently of each other may represent an optionally substituted heteroaryl or aryl group, whilst compounds wherein $R^6$ and $R^7$ represent an unsubstituted pyridine ring are preferred.

Further suitable linking reagents are the compounds of Type V

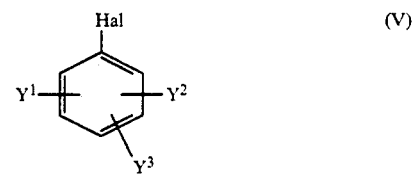

wherein Hal represents a halogen atom, preferably chlorine, and $Y^1$, $Y^2$ and $Y^3$ may be identical or different and may represent a hydrogen atom or a nitro group.

Of these compounds, picryl chloride is preferred.

Unless otherwise stated, the general definitions of $R^1$, $R^2$, $R^3$, $R^4$ and $R^5$ are used in the following way:

Alkyl generally represents a branched or unbranched $C_{1-12}$ hydrocarbon groups which may optionally be substituted by one or more halogen atoms— preferably chlorine— which may be identical or different from one another, the lower alkyl group being preferred. Lower alkyl generally represents a branched or unbranched hydrocarbon group having 1 to about 6 carbon atoms. Examples include methyl, ethyl, propyl, isopropyl, butyl, isobutyl, pentyl, isopentyl, neopentyl, hexyl, isohexyl, heptyl, isoheptyl, octyl and isooctyl.

Cycloalkyl generally represents a saturated or unsaturated $C_{3-9}$ hydrocarbon group which may optionally be substituted by one or more halogen atoms which may be identical or different from one another. Cyclic $C_{5-7}$ hydrocarbons are preferred, the cyclohexyl group being particularly preferred. Examples include cyclopropyl, cyclobutyl, cyclopentyl, cyclopentenyl, cyclohexyl, cyclohexenyl, cycloheptyl, cycloheptenyl, cycloheptadienyl and cyclooctyl, cyclooctenyl, cyclooctadienyl and cyclononynyl.

Aryl generally represents a $C_{6-10}$ aromatic group, also in compositions in which the aromatic group may be substituted by one or more lower alkyl groups, alkoxy groups, nitro groups, amino groups and/or one or more halogen atoms (which may be identical or different from one another). Preferred aryl groups are phenyl, naphthyl and biphenyl.

Within the scope of the above definition, heteroaryl generally represents a 5- or 6-membered ring which may contain, as hetero atoms, oxygen, sulphur, nitrogen and on to which another aromatic ring may be condensed. 5- and 6-membered aromatic rings which contain an oxygen, a sulphur and/or up to 2 nitrogen atoms and which are optionally benzocondensed are preferred. Examples of particular heteroaryl groups include thienyl, furyl, pyridyl, pyrimidyl, pyrazinyl, pyridanzinyl, quinoyl, isochinolyl, quinazolyl, quinoxalyl, thiazolyl, benzothiazol, isothiazolyl, oxazolyl, benzoxazolyl, isoxazolyl, imidazolyl, benzimidazolyl, pyrazolyl and indolyl, whilst of these pyridyl is particularly preferred.

Alkoxy generally represents a straight-chained or branched saturated or unsaturated $C_{1-12}$ hydrocarbon group, bound via an oxygen atom. Lower alkoxy with 1 to 4 carbon atoms is preferred, whilst the alkoxy group is substituted with one— preferably more— halogen atoms, preferably chlorine. Examples include methoxy, ethoxy, propoxy, isopropoxy, butoxy, isobutoxy, tert.-butoxy, pentoxy, isopentoxy, hexoxy, isohexoxy, heptoxy, isoheptoxy, octoxy or isooctoxy or allyloxy or methylvinyloxy.

Examples of other suitable reaction-promoting adjuvants are those listed, for example, in R.C. Larock, Comprehensive Organic Transformations— A Guide to Functional Group Preparations— VCH-Verlagsgesellschaft Weinheim 1989 Page 941 ff. and Page 966.

As well as phosgene and diphosgene, the following substances are particularly useful as reaction-promoting adjuvants:

Dicyclohexylcarbodiimide (DCC),
Bis(trichloromethyl) carbonate (triphosgene) and
Carbonyldiimidazole (CDI).

Pyridine or pyridine derivatives may be used as a acylation catalysts, whilst pyridine or dialkylaminopyridines such as those known from the literature [G. Höfle, W. Steglich and H. Vorbrüggen, Angew. Chem. 90 (1978) 602] are preferred. Pyridine and 4-dialkylaminopyridines are particularly preferred. pyridine and 4-dimethylaminopyridine and 4-pyrrolidinopiperidine [W. Steglich and G. Höfle, Angew. Chem 1 (1969) 1001] and 4-piperidinopyridine has proved particularly useful.

There are basically two known methods of preparing polyesters based on hydroxycarboxylic acids, particularly α-and β-hydroxycarboxylic acids, especially lactic acid and/or glycolic acid:

First of all, there is the possibility of reacting the corresponding hydroxycarboxylic acid or acids either in a melt at elevated temperature and under reduced pressure or in a suitable solvent, with azeotropic distillation of the water of reaction formed during condensation.

However, only polyesters of low molecular weight can be obtained by reactions of polycondensation of this kind [C.H. Holten, Lactic Acid, Verlag Chemie, Weinheim 1971, page 225 ff].

However, molecular weights of only about 10,000 can be achieved using azeotropic distillation [D.L. Wise, T.D. Fellmann, J.E. Sanderson and R.L. Wentworth in G. Gregoriadis (Editor) Drug Carriers in Medicine, Academic Press, London 1979 page 241 ff and loc. cit.], with the molecular weight which can be achieved depending significantly on the degree of dehydration (level of dewatering) in reactions of polycondensation of lactic acid or glycolic acid. Thus, a molecular weight of about 10,000 requires a degree of dehydration >99.28% [E.M. Filachione and C.H. Fischer, Ind. Eng. Chem 36 (1944) 223].

More recent dehydration methods, on the other hand, are supposed to make it possible to prepare polymers with a molecular weight of about 35,000 [EP 171 907].

Moreover, higher molecular weights are supposed to be obtainable by using condensation catalysts. Thus, polymers or copolymers of lactic or glycolic acid with a molecular weight of up to 30,000 should be able to be produced using inorganic acid catalysts [EP 172 636].

The use of ion exchangers as condensation catalysts is intended to permit the production of polymers with a molecular weight of about 35,000 [EP 26 599].

The second method of obtaining such polyesters consists in ring-opening polymerisation of the corresponding lactides (dilactones). Up till now, polymers or copolymers with a molecular weight of MW >35,000 have been obtainable only in this way.

The disadvantage of these methods of polymerisation is, however, that residues of the metal compounds added as catalysts (preferably tin or zinc compounds) have to be removed in a subsequent purification step which may be very laborious in certain cases, depending on the quantity of catalyst residue which is acceptable in view of the intended application [EP 270 987].

The aim of the present invention is therefore to provide a process for preparing polyesters based on hydroxycarboxylic acids, particularly α- or β-hydroxycarboxylic acids which makes it possible to produce these polyesters with a high molecular weight.

A further object of the present invention is to provide a process for producing polyesters containing no residual catalyst and, in particular, no residues of metal compounds.

The invention further sets out to provide a process for preparing the polyesters according to the invention which allows for a variation in the molecular masses sought, within the widest possible limits.

It is a further object of the present invention to provide a process which enables the polyesters according to the invention to be prepared as so called "random" and/or block polymers or copolymers.

According to the invention, these objectives are achieved by subjecting the corresponding hydroxy-carboxylic acids or the oligomers thereof to a reaction of polycondensation in the presence of the above- mentioned reaction-promoting adjuvants (linking reagents) and optionally in the presence of an acylation catalyst of the type mentioned. The use of linking reagents such as CDI, triphosgene or dicylohexyl-carbodiimide, in reactions of esterification is known per se from the prior art [J. March, Advanced Organic Chemistry 3rd Edition, John Wiley and Sons, New York 1985, page 348 ff and loc. cit.; B.C. Larock, Comprehensive Organic Transformation, VCH-Verlagsgesellschaft, Weinheim 1989, p. 941 ff and p. 966 ff; I.M. Panayotov, N. Belcheva and C. Tsetanov, "Preparations of polyester from aliphatic dicarboxylic acids and diols under mild conditions", Makromol. Chem. 188 (1987) 2821].

The reaction of polycondensation may be carried out in a melt or in an inert solvent which does not have a detrimental effect on the course of the reaction. Suitable solvents include, for example, those solvents which are conventionally used in reactions of polycondensation, including inter alia halogenated hydrocarbons such as dichloromethane or trichloromethane, or ethers such as tetrahydrofuran.

The desired molecular mass can be controlled by varying the reaction conditions, namely the temperature, reaction time, molar ratio of monomer or oligomer to the transacylation catalyst, and in particular, molar ratio of adjuvant or linking reagent to the monomer or oligomer.

If, for example, it is important that the polycondensation product according to the invention should have the highest possible molecular weight, at least stoichiometric quantities of linking reagent will be necessary. In addition, depending on the purity, particularly the moisture content of the educts used, an excess of linking reagent, compared with the use of correspondingly purer starting materials, may be necessary.

If linking reagents of general formula I are used wherein $R^1$ and/or $R^2$ represents halogen, particularly chlorine or trichloromethoxy, (such as phosgene or chloroformic acid esters or triphosgene) it is advantageous to add a base of preferably an amine such as triethylamine or pyridine, to the reaction mixture in order to mop up the hydrohalic acid formed during the reaction.

The purification of the polycondensation product (especially the removal of low molecular reaction products or non-reacted educts and linking reagent) is carried out using the methods of purification known from the prior art.

Depending on the nature of the polycondensation product obtained, either extraction methods or re-precipitation methods may be used.

Educts which may be used are hydroxycarboxylic acids, particularly $\alpha$ or $\beta$-hydroxycarboxylic acids of the same or different constitution, such as L-lactic acid, D-lactic acid, mixtures of D- and L-lactic acid and glycolic acid, or oligomers and co-oligomers thereof.

When selecting the educts or prepolymers, the level of condensation (level of polymerisation) may be varied within wide limits and may be between 1 and about 1000. A condensation level of between 10 and 100 is preferred.

As well as homopolymers and statistical copolycondensation products, block polymers may also be obtained using the process according to the invention by the use of various prepolymers, such as di- or triblock - or multiblock - polycondensation products, for example, multiblock polycondensation products form L-lactide and D,L-lactide and/or D-lactide.

Thus, in the block polymers produced according to the invention, the length of the corresponding block in the resulting copolymer can be influenced by a suitable choice of the level of polymerisation. In this way, the characteristics of the polycondensation product can be influenced. Terminal group modification, i.e. blocking of the terminal hydroxyl or terminal carboxyl group of the prepolymers also makes it possible to produce diblock polycondensation products.

The process according to the invention differs from the processes known from the prior art in that it can be used to produce polycondensation products with higher molecular weights, thus making it possible to obtain polymers which would otherwise be obtainable only by ring-opening polymerisation. However, compared with ring-opening polymerisation the process according to the invention has the advantage that it provides a substantially simpler and thus more economical method of removing the linking reagent. Thus, for example, if dicyclohexylcarbodiimide is used as the linking reagent, the dicyclohexylurea formed in the course of the reaction is largely removed from the reaction mixture by filtration, since this urea derivative is insoluble in the above-mentioned solvents.

The reaction product is thus totally free of metal compounds.

Moreover, the process according to the invention is by its nature superior to those based on the polymerisation of lactides, since the oligomers (from which the lactides required for polymerisation have to be produced in the first place) can be used directly as educts in the process according to the invention.

Moreover, the process according to the invention makes it possible to prepare "random" polycondensates in which there is actually a statistical distribution of the lactic acid and glycolic acid units, for example, whereas in the polymerisation of glycolide and lactide, for example, there is a risk of glycolide blocks forming in the polymer owing to the higher reactivity of the glycolide.

The Examples which follow are intended to illustrate the process according to the invention:

PRELIMINARY REMARKS

All the viscosities specified in the Examples were determined in 0.1% solution in chloroform at 25° celsius.

EXAMPLE 1

In a 100 ml round flask, 2.73 g of poly(L-lactide) with an inherent viscosity of 0.12 dl/g were dissolved in 50 ml of dichloromethane. 1.4 ml of triethylamine followed by mg 4-dimethylaminopyridine were added to the solution, which was then cooled to 0° C. After the addition of 297 mg of bis-(trichlormethyl)carbonate, the mixture was stirred for 3 hours at 0° C., and then for a further 18 hours at ambient temperature. The polymer was precipitated with 300 ml of methanol, washed with methanol and dried at 40° C. The inherent viscosity of the precipitated polymer was 0.49 dl/g.

EXAMPLE 2

In a 100 ml round flask, 3.57 g of poly(L-lactide) with an inherent viscosity of 0.12 dl/g were dissolved in 30 ml of trichloromethane. When 1.00 g of carbonyl diimidazole was added the development of gas started immediately. The reaction mixture was stirred at 15 minutes at ambient temperature, then refluxed for 1 hour. After the addition of another 500 mg of carbonyl diimidazole, the mixture was reacted for a further 5 hours at reflux temperature. The polymer was precipitated from the cooled reaction solution using 500 ml of methanol. The inherent viscosity of the polymer was 0.16 dl/g.

EXAMPLE 3

In a 100 ml round flask 3.57 g of poly(L-lactide) with an inherent viscosity of 0.12 dl/g were dissolved in 40 ml trichloromethane. The solution was mixed with 811 mg of carbonyldiimidazole and stirred for 1 hour at ambient temperature. After the addition of 37 mg of 4-dimethylaminopyridine the mixture was reacted for a further 3 hours at ambient temperature. The polymer was then precipitated with 800 ml of methanol, washed with methanol and dried at 30° C. The inherent viscosity of the polymer was 0.17 dl/g.

EXAMPLE 4

In a 100 ml round flask 7.14 g of poly(L-lactide) with an inherent viscosity of 0.12 dl/g were melted at 160° C. 61 mg of 4-dimethylaminopyridine and 1.14 g of dicyclohexylcarbodiimide were added in batches one after the other, with stirring. The reaction mixture was maintained at a temperature of 160° C. for 7 minutes and then cooled to ambient temperature. The inherent viscosity of the unpurified polymer was 0.15 dl/g.

EXAMPLE 5

7.14 g of poly(L-lactide) with an inherent viscosity of 0.12 dl/g were dissolved in 20 ml of dichloromethane. After the addition of 61 mg 4-dimethylaminopyridine a solution of 1.14 g of dicyclohexylcarbodiimide in 10 ml of dichloromethane was slowly added dropwise. After a short time the reaction solution became cloudy and more viscous. The mixture was stirred for 3 hours at ambient temperature, diluted with 20 ml of dichloromethane and suction filtered. The polymer was precipitated out of the filtrate with 400 ml of methanol, washed with methanol and dried. The inherent viscosity of the precipitated polymer was 0.97 dl/g.

EXAMPLES 6-12

Synthesis of various homo- and copolymers of lactic acid by reacting with dicyclohexylcarbodiimide (DCC) in the presence of 4-dimethylaminopyridine (4-DMAP) in dichloromethane:

EXAMPLE 14

The test was carried out according to Example 7 but with 0.4-times the batch size. Instead of 4-dimethylaminopyridine, 14.8 mg of 4-pyrrolidino-pyridine were used as catalyst. The inherent viscosity of the precipitated polymer is 0.77 dl/g.

EXAMPLE 15

The test was carried out according to Example 7 but with 0.4-times the batch size. Instead of 4-dimethylaminopyridine, 16.2 mg of 4-piperidino-pyridine were used as catalyst. The inherent viscosity of the precipitated polymer was 0.96 dl/g.

EXAMPLE 16

7.78 g of poly(DL-lactide) with an inherent viscosity of 0.08 dl/g were dissolved in 20 ml of tetrahydrofuran. After the addition of 30.5 mg of 4-dimethylaminopyridine the solution was cooled to 0° C. and 1.55 g of dicyclohexylcarbodiimide were added in batches. The reaction mixture was stirred for 3 hours at 0° C., diluted with 20 ml of tetrahydrofuran and added dropwise to 1200 ml of methanol. The polymer precipitated was dried. The inherent viscosity of the polymer was 0.55 dl/g.

EXAMPLE 17

8.92 g of poly(DL-lactide) with an inherent viscosity of 0.09 dl/g were dissolved in 20 ml of toluene. After

| Example | Prepolymer[1] | Polymer | CH$_2$CL$_2$ | DCC | 4-DMAP | Temp. | Reaction Time | Inh. visc. of product |
|---|---|---|---|---|---|---|---|---|
| 6 | L | 3.57 g | 40 ml | 516 mg | 15 mg | Ambient | 5 h | 0.39 dl/g |
| 7 | DL | 7.78 g | 20 ml | 1550 mg | 30 mg | 0 | 6 h | 1.15 dl/g[2] |
| 8 | DL | 7.78 g | 20 ml | 1550 mg | 92 mg | −20 | 4.5 h | 0.46 dl/g |
| 9 | L-G/10:1 | 2.00 g | 20 ml | 90 mg | 5 mg | Ambient | 3 h | 0.44 dl/g |
| 10 | DL-G/3:1 | 7.36 g | 30 ml | 619 mg | 61 mg | 0 | 6 h | 0.29 dl/g |
| 11 | DL-G/1:1 | 5.60 g | 22 ml | 619 mg | 2.4 mg | 0 | 17 h | 0.20 dl/g |
| 12 | D | 7.14 g | 15 ml | 1135 mg | 61 mg | 40 | 3 h | 0.67 dl/g |

The following abbreviations are used:
L: Poly (L-lactide), inherent viscosity = 0.12 dl/g
D: Poly (D-lactide), i.v = 0.23 dl/g
DL: Poly (DL-lactide), i.v = 0.08 dl/g
L-G/10:1: Poly (L-lactide-co-glycolide) Molar ratio 10:1, i.v. = 0.21 dl/g
DL-G/3:1: Poly (DL-lactide-co-glycolide) Molar ratio 3:1, i.v. = 0.17 dl/g
DL-G/1:1 Poly (DL-lactide-co-glycolide) Molar ratio 1:1, i.v. = 0.13 dl/g
[2]GPC- analysis of the polymer of Example 8 showed: Mw = 175000, Mn = 86000, Mw/Mn = 2.0
The GPC measurements were made using the following method:
Solvent: chloroform, 0.5 mg per ml
Temperature: ambient
Standard: narrowly distributed polystyrene standard
Detector: RI Detector
Flux: 1 ml/min
Columns: PL-GEL columns 250/300/300 mm in the exclusion limits 100/1000/100000 A

EXAMPLE 13

7.14 g of poly(L-lactide) with an inherent viscosity of 0.12 dl/g were dissolved in 20 ml of dichloromethane. 10 ml of a solution of 40 mg of pyridine per 100 ml of dichloromethane and 20 ml of a solution of 5.67 g of dicyclohexylcarbodiimide per 100 ml of dichloromethane were added successively dropwise. The mixture was stirred for 3 hours at ambient temperature and then suction filtered. The polymer was precipitated out of the filtrate with methanol, washed with methanol and dried. The inherent viscosity of the polymer was 0.20 dl/g.

the addition of 30.5 mg of dimethylaminopyridine the solution was cooled to 0° C. and 1.55 g of dicyclohexylcarbodiimide were added in batches. The reaction mixture was stirred for 6 hours at 0° C., diluted with 40 ml of toluene and suction filtered. The polymer was precipitated by adding the solution dropwise to 1200 ml of methanol and then dried. The inherent viscosity of the polymer was 1.00 dl/g.

EXAMPLE 18

5.23 g of poly(DL-lactide-coglycolide), molar ratio 50/50, with an inherent viscosity of 0.12 dl/g were reacted analogously to Example 17 with 619 mg of dicyclohexylcarbodiimide, 2.4 mg of dimethylaminopyridine in 30 ml of dichloromethane for 6 hours at ambient temperature. The inherent viscosity of the isolated polymer was 0.67 dl/g.

EXAMPLE 19

(AB)x — multi-block polymer, A = L-lactide, B = DL-lactide, A:B = 47.53

1.55 g of poly(DL-lactide) with an inherent viscosity of 0.08 dl/g and 1.36 g of poly(L-lactide) with an inherent viscosity of 0.12 dl/g were linked, with the addition of 12 mg of dimethylaminopyridine, 619 mg of dicyclohexylcarbodiimide and 10 ml of dichloromethane, to form a copolymer with an inherent viscosity of 0.5 dl/g. The other reaction conditions are the same as in Example 7. The polymer has a melting point of 143° C. (peak maximum in DSC at a heating rate of 5 K/min).

EXAMPLE 20

(AB)x — multi block polymer, A = L-lactide, B = D-lactide, A:B =40:60

By reacting 1.36 g of poly(L-lactide) with an inherent viscosity of 0.12 dl/g with 2.03 g of poly(D-lactide) having an inherent viscosity of 0.23 dl/g in 20 ml of dichloromethane (reaction conditions corresponding to Example 19) a copolymer with an inherent viscosity of 1.00 dl/g is synthesised. The polymer has a melting point of 195° C. (peak maximum in DSC at a heating rate of 5 K/min).

What is claimed is:

1. A improved process for preparing polyesters based on hydroxycarboxylic acids according to the following reaction plan

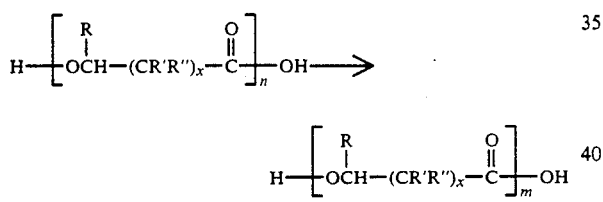

wherein R, R' and R'' independently of one another may represent an alkyl group and/or hydrogen and x and m and n may represent integers— wherein $m>n$ and x may also be zero, wherein the improvement comprises carrying out the condensation reaction in the presence of a linking reagent selected from the group consisting of:

a) compounds of the formula I

wherein $R^1$ and $R^2$ may be identical or different and may represent an alkyl, cycloalkyl or aryl group which may optionally be substituted;

b) compounds of the formula II

wherein $R^3$ and $R^4$ may be identical or different and may represent an alkoxy group, which may optionally be substituted by one or more halogen atoms, a 5-, 6- or 7-membered ring in which one or more carbon atoms may be replaced by one or more heteroatoms, said ring optionally being unsaturated and/or substituted, or a halogen atom;

c) compounds of the formula III

wherein $R^5$ may represent an optionally substituted alkyl or aryl group and X represents a halogen atom;

d) compounds of the formula IV

wherein $R^6$ and $R^7$ independently of each other may represent an optionally substituted heteroaryl or aryl group;

e) compounds of the formula V

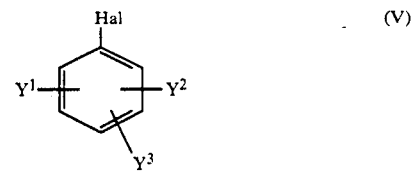

wherein Hal may represent a halogen atom and $Y^1$, $Y^2$ and $Y^3$ may be identical or different and may represent a hydrogen atom or a nitro group;

f) phosgene, diphosgene or triphosgene;

g) carbonyl diimidazole (CDI); and, h) dicyclohexylcarbodiimide (DCC).

2. The process according to claim 1, wherein the linking reagent used is a compound of the formula I

wherein $R^1$ and $R^2$ may be identical or different and may represent an alkyl, cycloalkyl or aryl group which may optionally be substituted.

3. The process according to claim 1, wherein the linking reagent used is a compound of the formula II

wherein $R^3$ and $R^4$ may be identical or different and may represent an alkoxy group, which may optionally be substituted by one or more halogen atoms, a 5-, 6- or 7-membered ring in which one or more carbon atoms may be replaced by one or more heteroatoms, said ring optionally being unsaturated and/or substituted, or a halogen atom, preferably chlorine.

4. The process according to claim 1, wherein the linking reagent used is a compound of the formula III

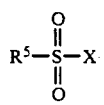

wherein $R^5$ may represent an optionally substituted alkyl or aryl group and X represents a halogen atom.

5. The process according to claim 1, wherein the linking reagent used is a compound of the formula IV

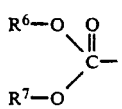

wherein $R^6$ and $R^7$ independently of each other may represent an optionally substituted heteroaryl or aryl group.

6. The process according to claim 1, wherein the linking reagent used is a compound of the formula V

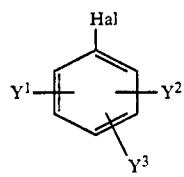

wherein Hal may represent a halogen atom and $y^1$, $y^2$ and $y^3$ may be identical or different and may represent a hydrogen atom or a nitro group.

7. The process according to claim 1, wherein phosgene, diphosgene or triphosgene is used as the linking reagent.

8. The process according to claim 1, wherein carbonyl diimidazole (CDI) is used as the linking reagent.

9. The process according to claim 1, wherein dicyclohexylcarbodiimide (DCC) is used as the linking reagent.

10. The process according to claim 1 wherein the reaction is carried out in the presence of an acylation catalyst.

11. The process according to claim 10, wherein a 4-dialkylaminopyridine is used as the acylation catalyst.

12. The process according to claim 11, wherein 4-dimethylaminoopyridine is used as the acylation catalyst.

13. The process according to claim 11, wherein 4-piperidinopyridine is used as the acylation catalyst.

14. The process according to claim 11, wherein 4-pyrrolidinopyridine is used as the acylation catalyst.

15. The process according to claim 1, wherein α-hydroxycarboxylic acids and/or the oligomers thereof are used.

16. The process according to claim 1, wherein β-hydroxycarboxylic acids and/or the oligomers thereof are used.

17. The process according to claim 1, wherein α- and β-hydroxycarboxylic acids and/or the oligomers thereof are used.

18. The process according to claim 1, wherein glycolic acid and/or the oligomers thereof are used.

19. The process according to claim 1, wherein lactic acid is used in the form of D- and/or L-lactic acid and/or the oligomers thereof.

20. The process according to claim 1, wherein glycolic acid and lactic acid are used in the form of D- and/or L-lactic acid and/or the oligomers thereof.

* * * * *